Jan. 21, 1969     F. A. ROBINSON     3,422,875

TUBELESS TIRE BEAD EXPANDER

Filed July 6, 1966     Sheet 1 of 2

Forrest A. Robinson
INVENTOR.

BY Clarence A. O'Brien
and Harvey B. Jackson
Attorneys

Jan. 21, 1969 F. A. ROBINSON 3,422,875
TUBELESS TIRE BEAD EXPANDER
Filed July 6, 1966 Sheet 2 of 2
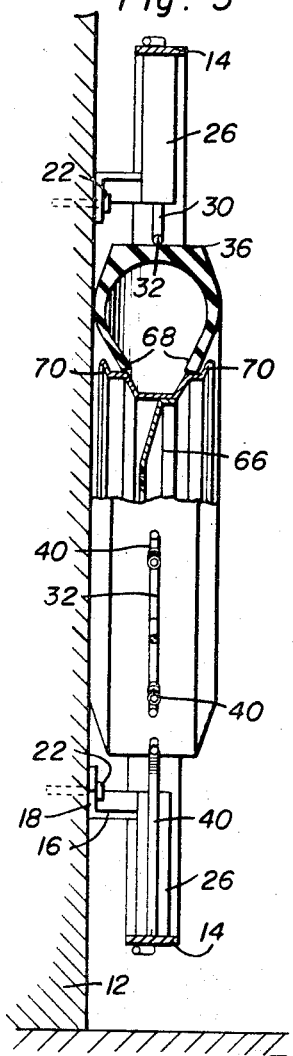
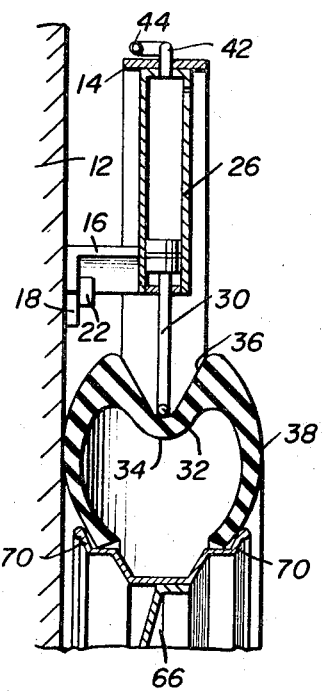
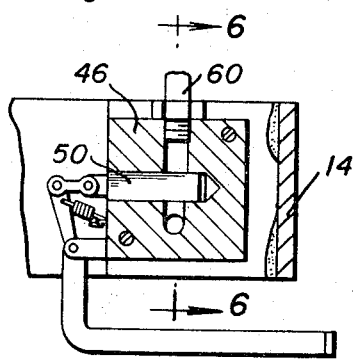
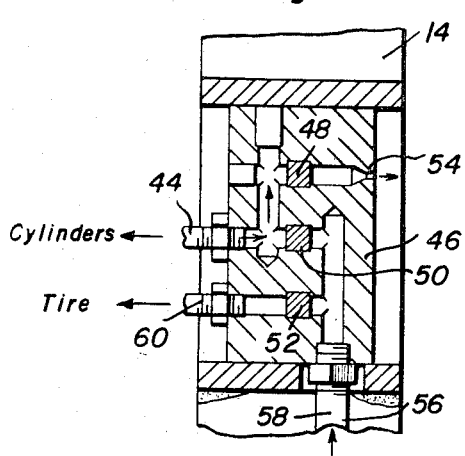
Forrest A. Robinson
INVENTOR.

United States Patent Office 3,422,875
Patented Jan. 21, 1969

3,422,875
TUBELESS TIRE BEAD EXPANDER
Forrest A. Robinson, 561 Main St.,
Keene, N.H. 03431
Filed July 6, 1966, Ser. No. 563,102
U.S. Cl. 157—1.21                                    8 Claims
Int. Cl. B60c 25/12

ABSTRACT OF THE DISCLOSURE

An open frame defining a center position and including a plurality of workpiece engageable clamp surface portions mounted within the confines of the frame and shiftable generally radially inwardly toward the center position along paths generally coinciding with the medial plane of the frame with means being provided to force the clamp surface portions inwardly toward the center position. The frame is provided with means operative to support the frame from a planar surface with the medial plane of the frame generally parallelling the planar surface and spaced outwardly from the latter a distance approximately equal to one-half the axial thickness of a conventional pneumatic vehicle tire, whereby a tire generally centered relative to said center position and disposed inwardly of the clamp surface portions may be abutted against the planar support surface and automatically be properly positioned for engagement of the center portion of the tread of the tire by the clamp surface portions upon their being forced toward the center position defined by the frame.

This invention relates to a novel and useful tubeless tire bead expander and more specifically to a machine adapted to spread apart the bead portions of a tubeless tire mounted on a wheel rim so as to force the bead portions of the tubeless tire or casing into substantially full contact with the corresponding flange portions of the rim in a manner forming a relatively good airtight seal between the rim and the bead portions of the tubeless tire casing. After such an airtight seal is formed, air may be introduced into the tubeless tire casing through an appropriate valve therefor carried by the associated wheel rim to inflate the tire casing. During inflation of the tire casing, air pressure within the tire casing pushing outwardly on the bead portions of the casing will urge the bead portions into fully seated engagement with the corresponding flanges of the associated wheel rim.

When a new tire arrives at a service station, it is wrapped tightly with strong paper. When the paper is removed, the bead portions of the casing tend to stay in closely juxtaposed relation and resist movement apart. Such a tire casing resists having its bead portions manually properly spread apart and positioned in relatively full contact with the flange portions of an associated rim so as to enable the tire casing to be inflated in the usual manner.

Since the period that tubeless tires first came into use there have been various tools designed for the purpose of causing the bead portions of a new casing to spread apart and fully contact the associated flange portions of a wheel rim in order that the casing may be properly inflated. A tool most widely used for this purpose is a steel band. The steel band system requires that after a casing is mounted on a wheel rim a band is placed about the circumference of the tire and then tightened to reduce the circumference of the center portion of the tread portion of the casing. This reduction of the circumference of the tread portion of a casing causes the bead portions of the casing to separate and thus be urged into engagement with the opposing flange portions of the associated wheel rim. Such engagement of the bead portions of a casing with the corresponding flanges of the associated wheel rim will enable the casing to trap air and to then be inflated to the recommended pressure. However, during the time the casing is being inflated, the band must be made to increase in circumference or diameter or a danger will exist in the air pressure within the casing having a tendency to break the band and cause injury to the person mounting the casing. Further, when using a steel band, the bead portions of the associated casing are not always spread apart in a manner so that the bead portions are disposed in parallel planes and this causes the casing to be unable to trap air and considerable adjustment of the band and jouncing of the casing is sometimes required before a sufficiently good air seal between the casing bead portions and the associated wheel rim is formed to enable the casing to be inflated.

It is accordingly the main object of this invention to provide a tubeless tire bead expander including structural features enabling the center portions of the tread portion of a tubeless tire casing to be evenly radially inwardly displaced in a manner such that the bead portions of the casing will be equally separated or spread apart so as to be disposed in parallel planes for ready full engagement with the opposing flange portions of an associated wheel rim.

Another object of this invention, in accordance with the immediately preceding object, is to provide a tubeless tire bead expander constructed in a manner whereby the expander may be readily mounted in a horizontal position on a flooring structure or in a vertical position on one side of a wall structure with the expander, in either mounted position, projecting only slightly outwardly of its supporting surface in a direction normal to that surface.

Still another object of this invention is to provide a tubeless tire bead expander which will be operable, after being utilized to initially radially inwardly and evenly deflect the center portion of the bead portion of an associated tire casing, to gradually allow the inwardly deflected portions of the tread portion of the tire casing to shift radially outwardly toward the normal positions thereof as the tire casing is inflated.

A final object of this invention to be specifically enumerated herein is to provide a tubeless tire bead expander in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical sectional view taken substantially upon the plane indicated by the section line 3—3 of FIGURE 2;

FIGURE 4 is an enlarged vertical sectional view similar to the upper portion of FIGURE 3 and illustrating the manner in which tthe bead expander is operative to radially inwardly deflect the center portion of the bead portions of the tire casing;

FIGURE 5 is an enlarged fragmentary sectional view taken substantially upon the plane indicated by the section line 5—5 of FIGURE 2; and FIGURE 6 is a fragmentary sectional view taken substantially upon the plane indicated by the section line 6—6 of FIGURE 5.

Figure 1:
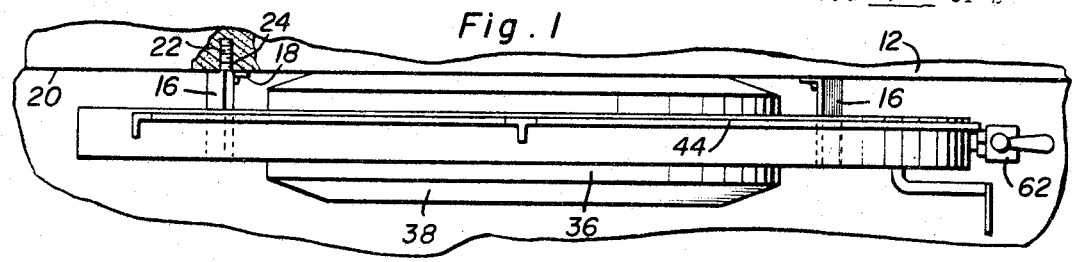
FIGURE 1 is a top plan view of the tubeless tire bead expander of the instant invention shown supported from a vertical wall structure, with portions of the wall structure being broken away and illustrated in section and with a vehicle wheel including a wheel rim portion and a tubeless tire casing mounted thereon operatively associated with the bead expander.
Figure 2:
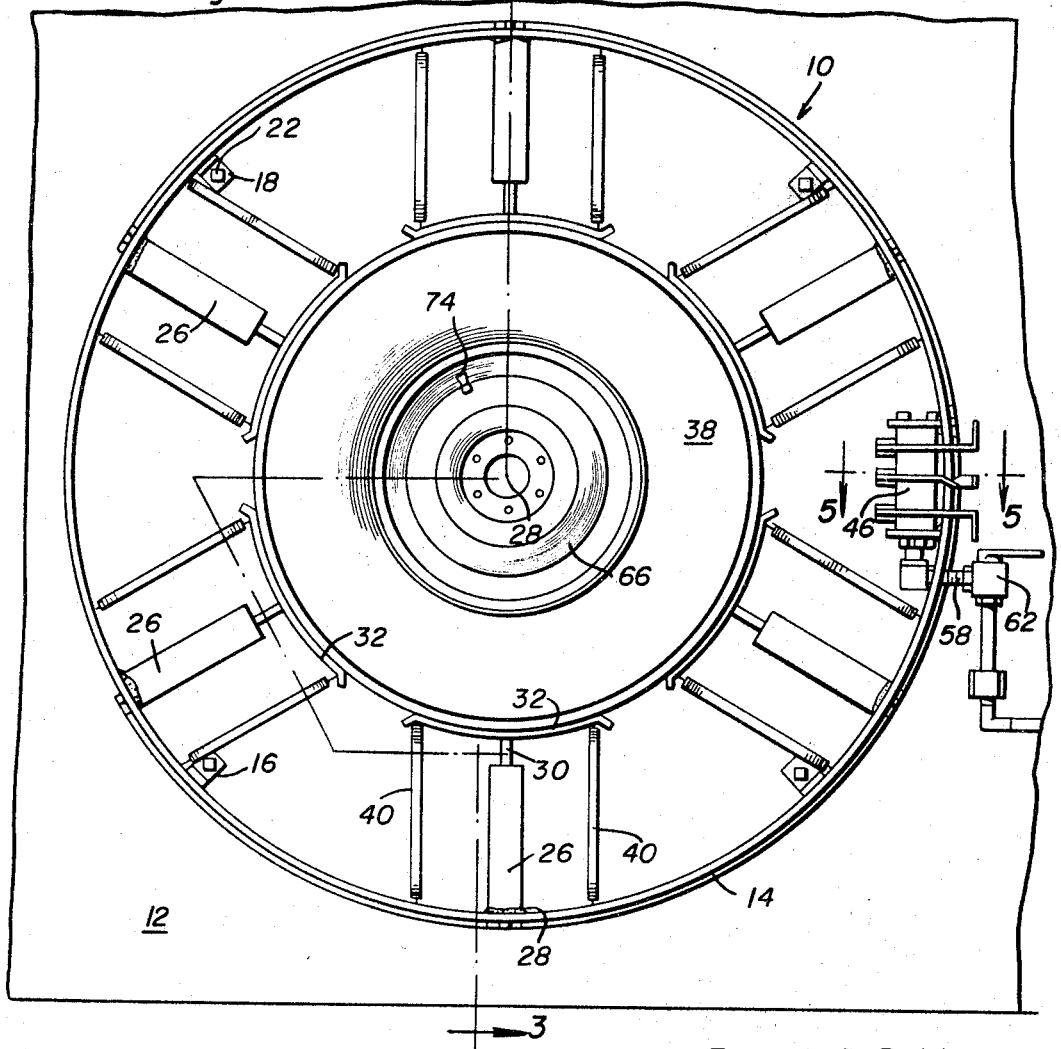
FIGURE 2 is a side elevational view of the assemblage illustrated in FIGURE 1.

Referring now more specifically to the drawings the numeral 10 generally designates the tire bead expander of the instant invention which is illustrated in FIGURES 1–4 of the drawings as being supported from a vertical wall structure 12.

The expander 10 includes a frame or base 14 defined by a cylindrical band including L-shaped mounting brackets 16 which are secured to the band 14 at points spaced circumferentially thereabout and project from the rear side of the frame or band 14 and terminate in angulated apertured flange portions 18. The flange portions 18 abut the outer face 20 of the wall structure 12 and suitable fasteners 22 are secured through the apertured flange portions 18 and embedded in the wall structure 12 as at 24.

A plurality of elongated longitudinally extendable pneumatic cylinders 26 are disposed within the frame and lie on radii of a central point 28 of the area enclosed by the frame 14. The outermost or base ends of the pneumatic cylinders 26 are secured to the frame or band 14 in any convenient manner such as by welding 28. As an alternative, the inner end portions of the base or cylinder ends of the cylinders 26 could be provided with laterally outwardly directed diametrically opposed mounting ears (not shown) through which suitable fasteners generally paralleling the cylinders 26 could be passed for securement in the band 14 on opposite sides of the outermost end of each cylinder 26. However, any suitable means may be utilized to secure the cylinders 26 to the band or frame 14.

The extendable or radial innermost ends of the cylinders 26 defining the movable piston portions thereof and designated by the reference numerals 30 are provided with transversely extending arcuate head portions 32 adapted for engagement with the center portion 34 of the tread portion 36 of an associated tire casing 38. The arcuate head portions 32 are inwardly concaved and a pair of expansion springs 40 are secured between the opposite end portions of each head portion 32 and the frame or band 14 on opposite sides of the outermost end of the corresponding cylinder 26. The springs 40, of course, serve to yieldingly urge the pneumatic cylinders 26 to their fully retracted positions.

The base or outermost ends of the cylinders 26 each include an air inlet and outlet fitting 42 opening into the corresponding cylinder 26 and communicated with an air supply header conduit 44 extending about the outer periphery of the frame or band 14. The header conduit 44 opens into a valve body 46 supported from the frame 14 and the valve body 46 supported from the frame 14 and the valve body 46 includes three movable valve elements 48, 50 and 52 for communicating the header conduit 44 with the ambient atmosphere through a restricted outlet opening 54, for communicating the header conduit 44 with the outlet end 56 of an air pressure supply line 58 also opening into the valve body, and for communicating the air supply line 58 with an air service line 60 which may be utilized to inflate the tire casing 38.

The air supply line 58 has a main valve 62 disposed therein upstream of the valve body 46 and may therefore terminate communication of the air supply line 58 upstream of the valve 62 with the valve body 46 and enable the tubeless tire bead expander 10 to be dismounted from the wall structure 12 and relocated.

In operation, the tire casing 38 is first mounted upon the wheel rim 66 with the bead portions 68 of the tire casing 38 received between the seating flange portions 70 of the wheel rim. An old tire casing will sometimes have its bead portions spaced considerably apart in the manner illustrated in FIGURE 3 of the drawings whereby the bead portions may be reasonably seated in relatively airtight engagement with the flange portions 70 without the use of the tire bead expander 10 as illustrated in FIGURES 1, 3 and 4 of the drawings with the wall 12 limiting penetration of the tire into the frame 14 and the tire centered relative to the medial plane of the frame 14 in which the head portions 32 are shiftable. However, a new tire casing will have its bead portions 68 spaced only slightly apart and therefore considerably inwardly of the seating flange portions 70 of the wheel rim 56. In order to properly expand the bead portions 68 outwardly to the positions thereof illustrated in FIGURE 4 of the drawings, the wheel rim 66 and tire casing 38 are first positioned in the tire bead expander. Then, the actuator 50 is actuated so as to expand the cylinders 26 whereby the head portions 32 will inwardly deflect the center portion 34 of the tread portion 36 thereby causing the bead portions 68 to shift apart in parallel planes to the positions thereof illustrated in FIGURE 4 of the drawings making a relatively airtight seal between the tire casing 38 and the flange portions 70. Thereafter, the actuator 50 may be utilized to terminate communication of the cylinders 26 with the air supply line 58 and the actuator 48 may be opened so as to slowly vent the cylinders 26 to the ambient atmosphere through the restricted outlet opening 55 while at the same time the tire casing 38 is being inflated through the valve stem assembly 74 secured in the wheel rim 66 after the valve actuator 52 has been opened and the air service line or conduit 60 has been operatively connected with the valve stem assembly 74. Of course, as the air pressure within the tire casing 38 increases, the bead portions 68 will be urged into tight seated engagement with the flange portions 70 and the piston portions 30 of the fluid motors 26 will be urged radially outwardly toward their fully retracted positions. Although air pressure within the tire casing 38 will be inoperative to fully retract the piston portions 30, the expansion springs 40 are capable of fully retracting the piston portions 30 so as to insure that the mounted and inflated tire casing 38 may be dismounted from the tire bead expander 10. Further, the stroke of the piston portions 30 is sufficiently long to enable the tire bead expander 10 to be utilized in conjunction with tire casings of various diameters.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire bead expander for a wheel mounted tire casing, said casing being of a predetermined axial thickness between the remote surfaces of its sidewalls, said expander including, a support surface, an open mounting frame extending substantially completely about a central area enclosed thereby and having a medial plane, said frame defining an unobstructed passageway therethrough disposed generally normal to said medial plane and through which said tire casing may be passed, a plurality of elongated longitudinally extendable members disposed within the confines of and spaced circumferentially about said frame and spaced outwardly of and extending generally radially of a point disposed centrally in said area, the radial outermost end portions of said members being supported from said frame, the innermost end portions of said members including head portions disposed within the confines of said frame and engageable with the tread portion of said casing when the latter is disposed in said frame concentric with said points and to urge circumferentially spaced portions of the tread portion of the casing engaged by said head portions inwardly upon extension of said members from their fully collapsed positions, and means operatively associated with said members for simultaneously extending said members, said frame including mounting means supporting said frame from said surface with the medial plane of said frame generally paralleling and spaced from said surface a distance equal, generally, to one-half said predetermined axial thickness of said casing, whereby insertion of said casing into said frame and abutting said casing against said surface will automatically position said casing for proper engagement of said head portions with the opposing circumferentially spaced tread portions of the casing.

2. The combination of claim 1 wherein said extendable members comprise pneumatic cylinders.

3. The combination of claim 2 wherein said means operatively associated with said members comprises air conduit means opening into each of said cylinders and including an air inlet adapted to be communicated with a suitable source of air under pressure.

4. The combination of claim 3 wherein said air conduit means includes control valve means disposed downstream of said air inlet and operative to selectively communicate and terminate communication of the portion of said air conduit means downstream of said control valve means with said air inlet.

5. The combination of claim 4 wherein said control valve means, when activated to terminate, communicate the portion of said air conduit means downstream of said control valve means with said inlet, includes means operative to communicate said portion of said air conduit means downstream of said control valve means with the ambient atmosphere by way of restricted outlet opening means to thereby slowly vent the extended pneumatic cylinders as said casing is inflated.

6. The combination of claim 5 including means operatively associated with said pneumatic cylinders yieldingly urging said cylinders toward their fully retracted positions.

7. The combination of claim 1 wherein said head portions comprise elongated transversely extending members carried by the innermost ends of said extendable members and projecting from opposite sides of the corresponding extendable members, said elongated head portions being disposed generally in the medial plane of said frame and extending generally at right angles to the radii on which the corresponding extendable members lie.

8. The combination of claim 7 including a pair of expansion springs secured between the opposite ends of each head portion and said frame generally paralleling the corresponding extendable members and serving to yieldingly urge said extendable members toward their fully retracted positions, said springs also serving to resist rotation of said head portions about the center axis of the corresponding extendable member.

References Cited

UNITED STATES PATENTS

| | | |
|---|---|---|
| 1,738,504 | 12/1929 | Stevens. |
| 2,712,850 | 7/1955 | Rerick _____ 157—1.21 |
| 3,020,831 | 2/1962 | Barnes _____ 157—1.21 X |

TRAVIS S. McGEHEE, *Primary Examiner.*